United States Patent [19]

Grimes et al.

[11] Patent Number: 4,729,128

[45] Date of Patent: Mar. 1, 1988

[54] PERSONAL IDENTIFICATION CARD SYSTEM

[76] Inventors: Marvin G. Grimes, P.O. Box 1462, Campbell, Calif. 95009-1462; Norman E. Dixon, 7114 Road 42, Pasco, Wash. 99301

[21] Appl. No.: 742,942

[22] Filed: Jun. 10, 1985

[51] Int. Cl.⁴ ............................................. G06K 7/00
[52] U.S. Cl. ..................................... 382/58; 235/380; 283/94; 340/825.34; 358/112; 367/8
[58] Field of Search ...................... 382/58; 340/825.34, 340/825.31, 825.32, 825.33; 235/380, 439, 487, 488; 283/72, 75, 94, 111; 73/599; 367/7, 8, 87; 358/112; 380/23, 59

[56] References Cited

U.S. PATENT DOCUMENTS 4,099,207  7/1978  Kornreich et al. .................... 382/58
4,568,936  2/1986  Goldman ............................. 235/380

FOREIGN PATENT DOCUMENTS 0881788  12/1981  U.S.S.R. ................................. 367/87

OTHER PUBLICATIONS

Sondhi, M. M., "Reconstruction of Objects from Their Sound–Diffraction Patterns", *The Journal of the Acoustical Society of America*, 1969, vol. 46, No. 5 (part 2), pp. 1158–1164.

*Primary Examiner*—Leo H. Boudreau
*Assistant Examiner*—Jose L. Couso
*Attorney, Agent, or Firm*—Harris Zimmerman; Howard Cohen

[57] ABSTRACT

A method and apparatus for a personal identification card system includes a card having a plurality of lamina joined permanently together, with identification information written on the inner surfaces of the lamina. The information is not visible from the exterior of the card, and is written as analog and digital indicia and images adapted to be read by ultrasonic imaging means. An ultrasonic imaging card reading terminal may include either pulse-echo, through-transmission, or tomographic amplitude sensing devices, or may include acoustic holographic imaging sensors for appropriately formed indicia and images. The personal identifying data contained within the card may include a fingerprint image or an acoustic vocal spectrogram of the individual, as well as personal identifying numbers, signature, and the like.

11 Claims, 13 Drawing Figures

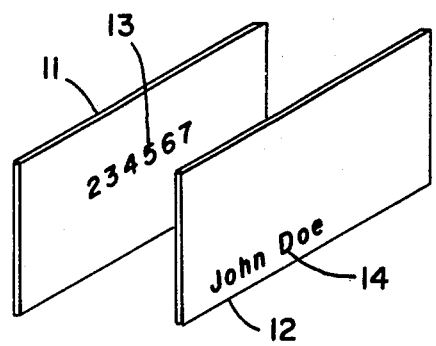
FIG _ 1
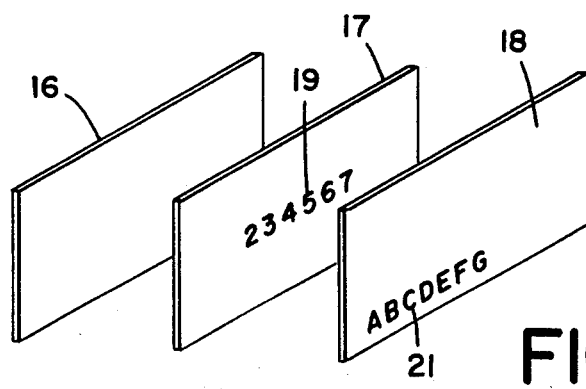
FIG _ 2
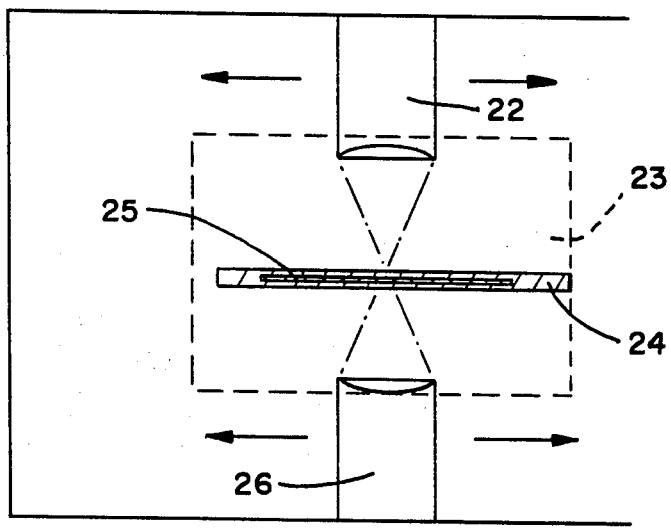
FIG _ 3

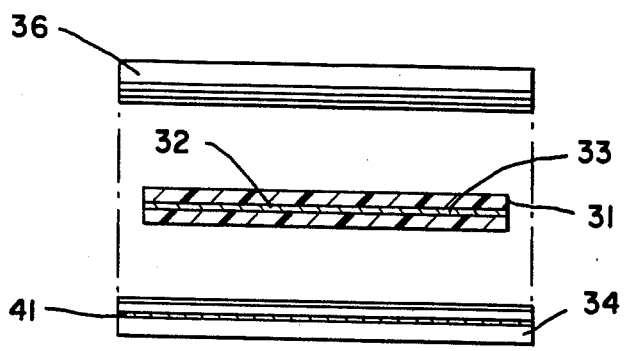
FIG_4
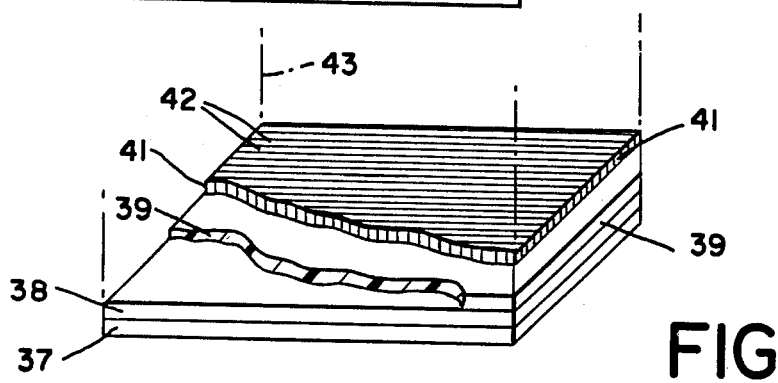
FIG_5
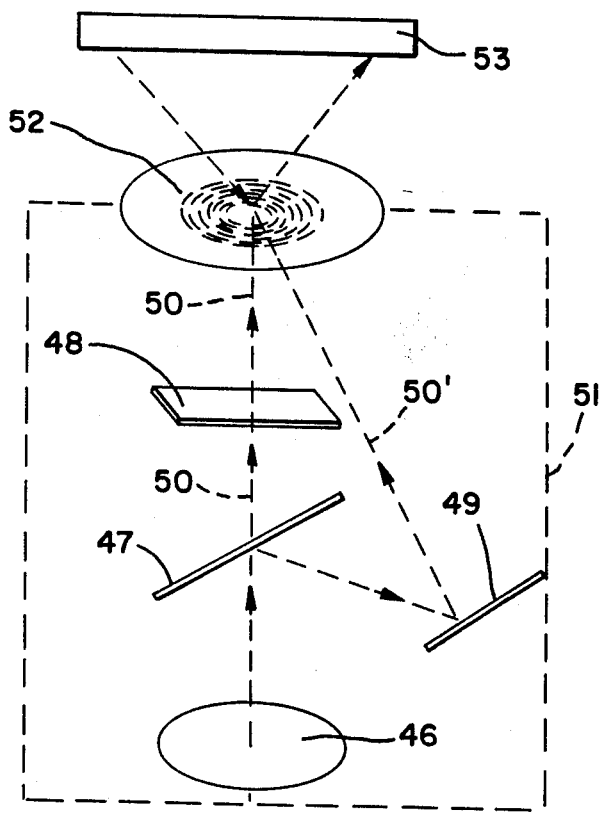
FIG_6

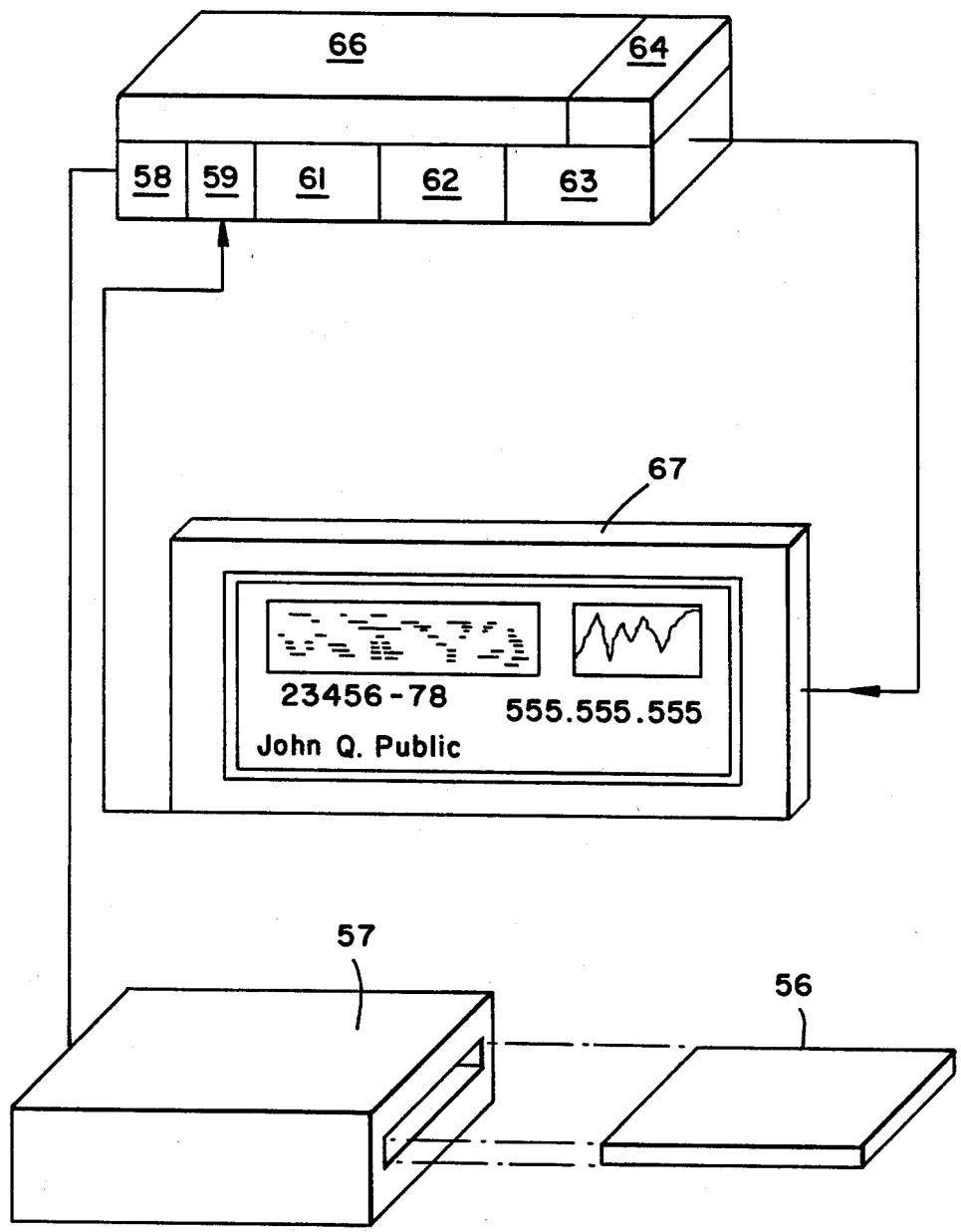
FIG_7

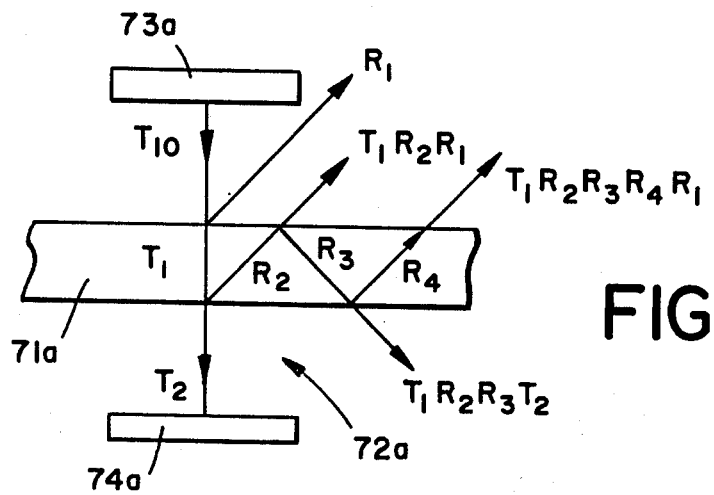
FIG _ 8a
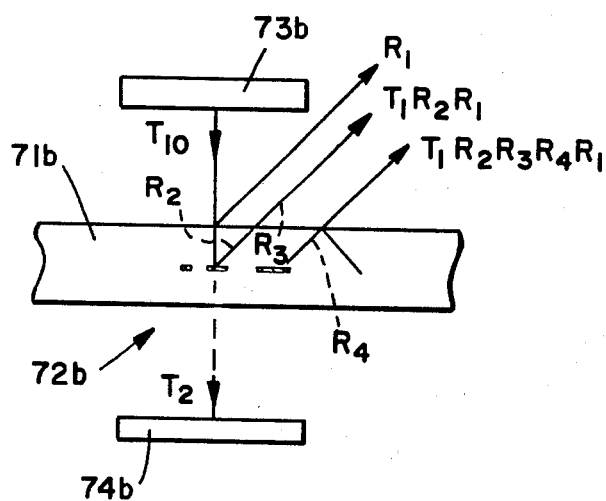
FIG _ 8b
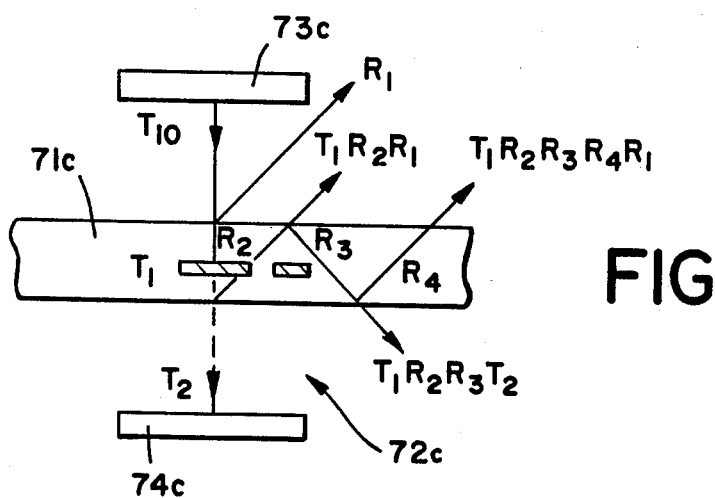
FIG _ 8c

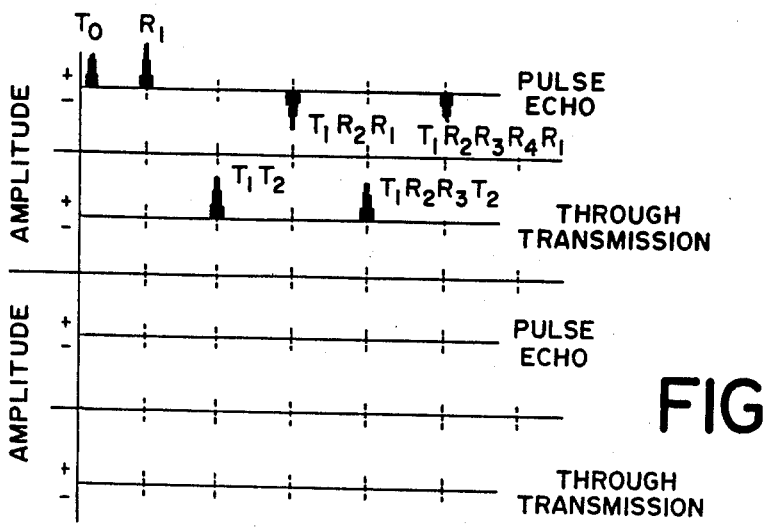
FIG _ 9a
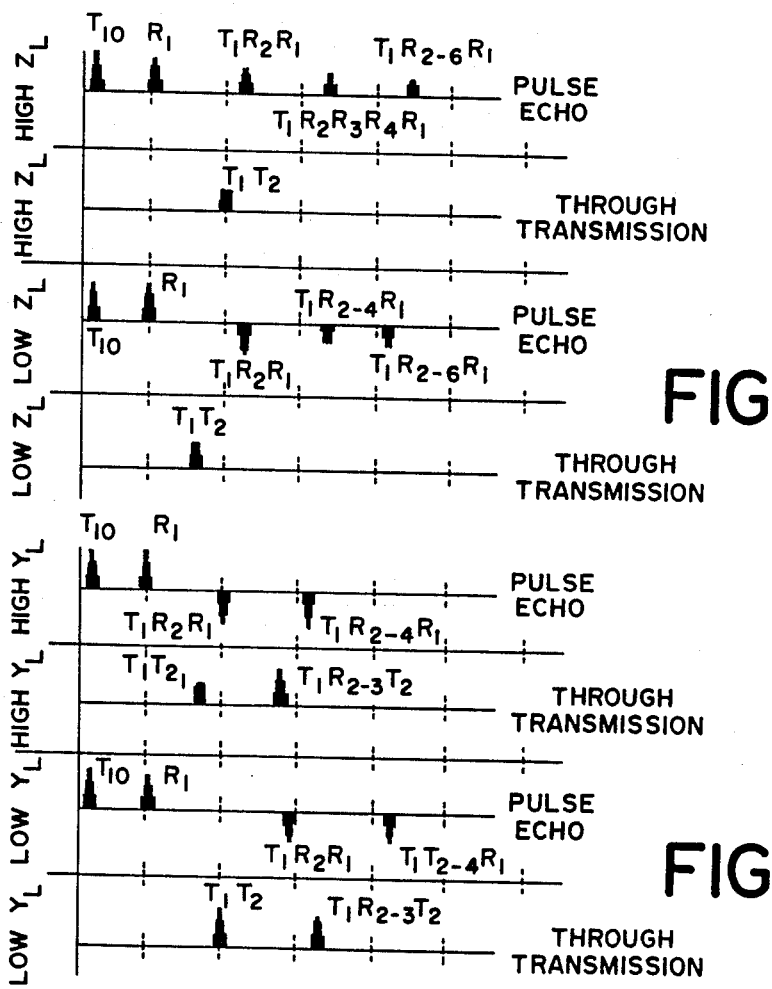
FIG _ 9b
FIG _ 9c

PERSONAL IDENTIFICATION CARD SYSTEM

BACKGROUND OF THE INVENTION

In recent years the phenomenal growth of the use of credit cards, automatic bank teller machines, identification cards, and the like has alleviated the problems associated with individuals carrying large amounts of cash and valuables on their persons. Unfortunately, these newly created card devices have engendered new problems unique to their existence. Although credit cards (this term will be used generically herein to encompass all forms of credit, identification, and machine readable cards) are not as anonymous and transferable as cash, they are still subject to unauthorized use due to loss, theft, and forgery. Indeed, in some situations credit card fraud can be more egregious than loss of cash or valuables, due to the great amount of wealth which may be called forth and misappropriated from the criminal misuse of one small plastic card.

In its typical form a credit card comprises a rectangular, pocket-size piece of laminated plastic which bears the name of the issuing authority or institution, the name of the individual who is the authorized user, an identifying number, and perhaps an expiration date. This information is usually embossed so that the indicia may be transferred to a credit invoice by direct impression. Most credit cards also include a space for the authorized person's signature, so that the signature may be compared with the user's signature at the point of sale or credit. However, this system obviously provides the opportunity for a dexterous criminal to copy and forge the signature of the authorized individual. indeed, even when a photo of the authorized person is provided on the card, forgery of the entire, including the photo and signature, has frequently been accomplished by talented criminals.

A more recent innovation has been the inclusion of a magnetic strip on one surface of the card, the strip being encoded with bearer data such as an authorization number which is not indicated outwardly on the card. Some criminals with access to card readers have been able to scan the magnetic strip of a stolen card to determine the authorization number. More often, however, the authorized individual writes the number on a card or paper accompanying the credit card, so that the number is not forgotten. In this way the criminal may gain access to the authorizing number, and thus to the credit resources of the individual.

SUMMARY OF THE PRESENT INVENTION

The present invention generally comprises a method and apparatus for providing a credit card and personal identification card system which virtually eliminates the unauthorized use of such cards. A salient feature of the present invention is the provision of a credit card which includes embedded information or characteristics unique to the authorized individual but unreadable by any visual means. Moreover, the information does not appear at all on the exterior of the card, so that the right of privacy of the authorized individual is not infringed at all. Furthermore, the embedded information may include personal characteristics which cannot be forged or reproduced except by the authorized individual.

The apparatus of the personal identification card system of the present invention includes a card having a plurality of laminar composite layers of optically opaque, acoustically transparent plastic, resin, metallic film, or fiber inlaid material. The layers are joined permanently together by bonding, cladding, or the like, with identification information and characteristics written on the inner surfaces of the lamina. The information is not visible from the exterior of the card, and is written as analog and digital indicia and images adapted to be read by ultrasonic imaging means. Such information may include the authorized cardholder's signature, fingerprint, voiceprint, or other personal characteristic which are virtually impossible to duplicate by other persons. The information may also include numerical indicia such as authorization codes, social security number, birthdate, and the like, which are difficult to obtain by other individuals.

The invention also includes the ultrasonic imaging card reading terminal for reading the information covertly stored within the lamina of the card of the present invention. The terminal includes liquid or dry coupling means for connecting an ultrasonic scanning device to the card. The scanning device may employ such prior art techniques as pulse-echo two dimensional B-scan, through-transmission two dimensional B-scan; pulse echo, three dimensional volumetric C-scan; pulse-echo, three dimensional tomographic scan in terms of amplitude (acoustic impedance mismatch) and/or time (acoustic velocity) through-transmission, tomographic area-amplitude scan liquid surface acoustic holography; and electronic reference acoustic holography.

The terminal of the present invention is adapted to provide "on the spot", virtually instantaneous reading of the information in the card, so that the authenticity of the card bearer may be determined through comparison of the personal characteristics of the bearer and the record thereof in the card. In addition, the numerical indicia provides further verification opportunity, so that unauthorized use of a card of the present invention is reduced to a minimum level far below any prior art card identification system.

BRIEF DESCRIPTION OF THE DRAWING

FIG. 1 is an exploded perspective view of one embodiment of the identification card of the present invention.

FIG. 2 is an exploded perspective view of a further embodiment of the identification card of the present invention.

FIG. 3 is a schematic representation of one embodiment of the ultrasonic card scanning device of the present invention, using either pulse-echo or through-transmission measuring and imaging techniques.

FIG. 4 is a side elevation of an ultrasonic card scanning device of the present invention, using through-transmission ultrasonic measuring and imaging in conjunction with electronic scanning and dry acoustic coupling.

FIG. 5 is a partially cutaway perspective view of one of the scanning detectors depicted in FIG. 4.

FIG. 6 is a schematic representation of a real time, ultrasonic scanning, liquid surface holographic image retrieval system used in conjunction with the identification card system of the present invention.

FIG. 7 is a block diagram representation of an embodiment of the identification card scanning terminal of the present invention, employing electronically referenced, holographic imaging techniques to retrieve information from the card of the present invention.

FIGS. 8a–8c are schematic views depicting the ultrasonic beam propagation and detection paths for pulse-echo and through-transmission information retrieval techniques in the card scanning device of the present invention.

FIGS. 9a–9c are graphic plots of amplitude versus time and phase for the interrogation beam and the received beam in the various embodiments of the ultrasonic card scanning device of the present invention.

DESCRIPTION OF THE PREFERRED EMBODIMENT

The present invention generally comprises a personal identification card system, and encompasses such items as credit cards, automatic teller machine access cards, identification cards, driver's license cards, and the like. A salient feature of the present invention is that the card of the present invention incorporates information and personal characteristics unique to the individual who is authorized to use the card, so that identification of that individual may be made without error. This information is not displayed overtly on the exterior of the card, however, so that the privacy of the individual is not comprised, and so that unauthorized use of the card is made extremely difficult if not impossible.

With regard to FIG. 1, one embodiment of the identification card of the present invention includes two layers 11 and 12 adapted to be bonded or clad together in permanent fashion. At least one confronting surface of the two layers is provided with identification information 13 written thereon in digital, analog, or indicial form. Joining of the two layers renders the information 13 totally unintelligible by visual inspection. The layers 11 and 12 are formed of plastic or like materials having excellent ultrasonic energy propagating characteristics and additionally include substances to render the layers optically opaque to obscure the data 13. The materials and the data encoding and writing technique are also selected to prevent retrieval of the data 13 by techniques such as electromagnetic interrogation, microwave and capacitive dielectric scanning, radiation scanning by hard $\beta$, gamma, x-ray, and neutron imaging methods, and by thermal and infrared techniques. Thus the only means for reading the data 13 is by use of ultrasonic scanning techniques, as will be explained in the following description. The data 13 may be written by engraving, etching, plating, machining, printing of acoustically functional material, or the like. The exterior of the layer 12 is provided with indicia 14, such as the name of the individual authorized to use the card. It may be appreciated that the outward appearance of the card provides absolutely no clue as to the information or data incorporated within the card.

Another embodiment of the identification card of the present invention, shown in FIG. 2, includes a pair of outer layers 16 and 18, with a core layer 17 interposed therebetween. Data 19 is written on at least one surface of the core layer 17, by means described previously, and the three layers are bonded or otherwise permanently joined to form the card. A simple data statement 21, such as the name of the authorized user, maybe be placed on the exterior surface. As before, the materials and the encoding and writing techniques are selected so that only ultrasonic scanning techniques may retrieve the data. The data may be written in a form that provides an acoustic impedance either higher or lower than the impedance of the core 17. The phase of a reflected ultrasonic beam traversing a high to low impedance interface is reversed by 180°, while the transition from low to high impedance causes no phase change, and through transmission causes no phase change in either case. Thus, the phase of the reflected signal may be derived to determine the location and data content of the acoustic indicia. Alternatively, the indicia which comprise the data 19 may be formed of a material having a higher or lower acoustic velocity than the material of the core 17. The ultrasonic signal passing through the indicia will be temporally displaced with respect to the signal through the core itself, and this displacement may be used to determine the information content of the indicia, as will be explained in the following description.

With reference to FIG. 3, one embodiment of the pulse-echo form of ultrasonic card data retrieval system of the present invention includes an ultrasonic transducer transmitter-receiver 22, and an ultrasonic receiver transducer 26 disposed in coaxial alignment. An identification card 24 containing embedded data 25, as described previously, is inserted between the components 22 and 26, in a liquid coupling medium 23 which minimizes impedance mismatch between the transducers and the card material. The transducer 22 and 26 are mechanically coupled so that they translate in common laterally along the plane of the card 24 for spatial translation imaging.

Ultrasonic energy in the form of a high resolution pulse is transmitted from the transducer 22 through the medium 23 to the card 24. A portion of the pulse energy is reflected from the card-coupling medium interface, while the remainder of the pulse is conducted into the card and continues to propagate to the back surface of the card when no encoded data is disposed in the pulse path. A second reflection takes place at the back surface, and returns toward the transducer 22. A small portion of the pulse energy arrives at the transducer 26. In the event that reflective data portions in the segment 25 are disposed in the pulse path, a substantial portion of the pulse will be reflected therefrom, and virtually no reflection will occur at the back surface of the card. Electronic gating is employed to separate the reflective data signals from the card boundary signals, the data signals being subsequently displayed by the device to yield an image of the embedded data 25. This use of reflected ultrasonic energy comprises pulse-echo imaging of encoded data. The signal (or absence thereof) from the transducer 26 may be used to confirm the presence of the reflective data in the layer 25. The signal relationships are discussed in the following and depicted in FIGS. 9a–9c.

The use of angle beams to propagate shear wave energy as opposed to longitudinal wave energy in the card may be used to improve the range resolution of the device due to the slower velocity of the shear wave in the card material, resulting in greater temporal separation of the signals and greater ease in gating and separating the various signals.

A through-transmission embodiment of the ultrasonic card scanning system is depicted in FIGS. 4 and 5. The system includes a laminated identification card having embedded data portion 32 and 33, comprising acoustically reflective portions and controlled acoustic velocity portions, respectively. A pair of acoustic transducer assemblies 34 and 36 are disposed in spaced apart, opposed fashion and adapted to receive the card 31 therebetween. Each of the transducers is comprised of a plurality of stacked layers laminated together, and includes an acoustic coupling layer 37 adapted to impinge one one lateral surface of the card 31. The layer 37 is formed of a material which optimizes the acoustic impedance match between the card and the transducer itself, so that propagation of ultrasonic energy into the card is maximized. Adhered directly to the coupling layer 37 is a conductive layer 38 which is connected to electrical ground.

Joined to the grounded layer 38 is further layer 39 formed of a piezoelectric material and adapted to generate acoustic energy. The layer 39 may comprise a piezo electric crystalline material, or plastic film, or the like, as is known in the prior art. Another layer 41 joined to the piezo layer 39 is comprised of a large plurality of conductive elements 42 extending laterally and arrayed in closely spaced, adjacent fashion. The conductive elements 42 are electrically isolated each from the other, and are individually connectable (addressable) by techniques commonly known in the prior art. It is significant to note that the conductive elements of the transducer 34 are arrayed perpendicularly with respect to the conductive elements of the transducer 36, although the arrays are disposed in parallel planes.

In the operation of the embodiment of FIGS. 4 and 5, the card 31 is placed between the transducers 34 and 36, with the coupling layers 37 thereof impinging on the opposed sides of the card. The conductive elements 42 of the transmitting transducer are then actuated sequentially, causing electrical stimulation of the strip of piezo layer 39 directly adjacent to the conducting element as current flows therefrom to the grounded layer 38. The acoustic pulse emanating from the energized strip is conducted through the coupling layer to the card, and propagated therethrough to the opposed receiver transducer.

However, the receiver transducer conductive elements are disposed orthogonally with respect to the line-configured transmitting area. To scan the card 31, the same transmitting line element is pulsed repeatedly, while the receiver transducer the line-configured receiving elements are actuated sequentially, so that a line of received pulses is swept laterally across the card. The next transmitting element is then pulsed repeatedly to form the next line, and the process is repeated to form a raster scan of the entire card. In the event that reflective data segments are present in the pulse path, the received signal is diminished by an amount equal to the reflected energy removed from the transmitted beam in the zone of the reflective segment. Differing acoustic velocity segments will temporally displace the received pulse with respect to the time or reception through the card material itself, and proper receiver gating can resolve the velocity-coded areas.

Diffraction effects may tend to degrade the received signal, especially in resolving small area reflective segments. Higher ultrasonic frequencies reduce diffraction effects for small area reflectors, but cause higher signal attenuation. Therefore, a trade-off between frequency and attenuation must be optimized to obtain the best resolution and signal-to noise factor for the card material and thickness. This is accomplished by proper choice of pulse width and frequency to provide the optimum spectral frequency content. The resolution is also a function of the width and separation of the conductive elements in the receiver and transmitter transducers. In the preferred embodiment the elements are approximately 12 mils (0.33 mm) wide with a separation of 3 mils (0.13 mm), and the area resolution is approximately 12 to 15 mils (0.33–0.38 mm).

FIGS. 8a–8c depict the possible ultrasonic signal paths in scanning a card of the present invention in which the data is embedded using reflective means or variable acoustic velocity means to alter the signal. FIGS. 9a–9c graphically depict the time and phase of the signals propagated through the card of the present invention, using either reflective or variable acoustic velocity means, and correlate directly with the path depictions of FIGS. 8a–8c. The components in each figure include the identification card 71, a liquid or dry coupling medium 72, a transmitting and receiving transducer 73, and a receiving transducer 74, all labelled with the appropriate suffix. The beam paths are labelled as $T_n$ for transmitted pulse, and $R_n$ for reflected pulse, with n equal to the number of the path segment along the propagation path. FIG. 8a depicts a card portion containing no embedded data, FIG. 8b depicts acoustic beam propagation through high or low acoustic impedance ($Z_L$) reflector encoded data. FIG. 8c illustrates acoustic beam propagation through encoded data formed by acoustic velocity elements having higher or lower acoustic velocity ($V_L$) than the card material.

The signal $T_{10}$ shown in the pulse-echo wavetrain of FIG. 9a represents the transmitted pulse energy at time zero and is common to all the graphs of FIG. 9. The signal $R_1$ is the first reflected signal from the card-couplant interface, and is also common to all the graphs. Signal $T_1R_2R_1$ shown in the pulse-echo wavetrain of FIG. 9a is the first internal card roundtrip reflected signal, and signal $T_1R_2R_3R_4R_1$ is the second roundtrip reflected signal. It is significant that these signals are reversed in phase, by 180° and 540°, respectively, due to the low $Z_L$ of the card-couplant reflecting interfaces. Signal $T_1T_2$ is the first through-transmission signal to be received by the receiving transducer, and its phase is the same as the initially transmitted pulse. The second through-transmission signal is $T_1R_2R_3T_2$, and its phase shift of 360° puts it in phase with the initial pulse.

Such interpretation of the signal path relationships and phase and timing relationships determines the card scanner requirements for signal analysis, particularly for time gating and phase acceptance. For example, the presence of a reflective data segment in FIG. 8b attenuates the first through transmission $T_1T_2$, with respect to the absence of data in FIG. 8a, without temporal shifting of the signal. It is clear that discrimination of data depends on gating the received signal in the time space around $T_1T_2$, and detecting the differing amplitudes. In pulse-echo detection, a high $Z_L$ data segment (FIG. 8b) will time shift and phase shift 180° the first signal received, in comparison to the no data example of FIG. 8a, and the time gating and phase detecting requirements are evident. The low $Z_L$ example does not shift the phase, but the return signal is time shifted closer to the initial pulse, since the path length is shorter. Thus, a time gate spaced closer to the initial pulse will discriminate the presence of data segments in the card.

It is apparent that the time shift and phase shift of the through-transmission and pulse echo signals provide the necessary information to detect the presence of date embedded within the identification card of the present invention. The presence of high and low acoustic velocity reflective and transmissive data elements exhibit uniquely identifiable characteristics. Correlating the presence or absence of data elements with a raster-type representation of the card provides a complete image field of the data within the card. Instrumentation with such capabilities is well known in the prior art.

A further method for storing information within the card of the present invention comprises forming a holographic image within the embedded layer or surface, and scanning the image ultrasonically in the card reading terminal to retrieve the image. As in the previous embodiments, the holographic image elements may be written within the card by engraving, printing, impressing, etc., and the image is scanned as depicted schematically in FIG. 6. The holographic scanning system in the card reading terminal includes an ultrasonic transmitting transducer 46 emitting a pseudocontinuous wave beam along a path directed toward the identification card 48. A beam splitter 47 interposed in the beam path divided the ultrasonic beam into two separate beams, one of the beams 50 continuing along the original path to pass through the card 48. The other, reference beam 50' is directed to a reflector 49, and the reflected beam is directed to converge with the path of the beam 50 after it passes through the card 48.

The elements 46–49 are all immersed in a liquid coupling medium 51 which enhances ultrasonic beam propagation. Furthermore, the beams 50 and 50' are aligned to intersect at a portion 52 of the surface of the liquid coupling medium, forming an interference pattern which contains the holographic information embedded within the card 48. The radiation pressure of the interfering beams physically distorts the liquid surface. A conventional coherent light laser holographic imaging system 53 then scans the surface portion 52 to form a visible holographic image of the card-contained image. The operator of the identification card scanning device may view the hologram for purposes of identification and comparison; however, additional instrumentation is required to analyze and evaluate any additional encoded digital or analog information embedded in the card, as described previously.

With reference to FIG. 7, a further embodiment of the present invention is adapted to read both digital and analog data as well as holographic image data from a card 56 of the present invention. It includes a ultrasonic card scanning device 57, acoustically dry coupled to the card 56, as described previously, which is connected to an ultrasonic pulse generator and sequencer 58. The output of the card scanner 57 is fed through a receiver amplifier and pulse sequencer 59 to a temporal gating device 61. The temporal gating device is controllable to select the depth of the imaging plane for the hologram or C-scan imaged data, and also to time gate and phase and amplitude detect the B-scan data, according to the mode desired by the operator. A control panel 64 provides operator control and selectivity, and a microprocessor 66 operates the system according the the operator commands entered through the control panel.

The gated signal information passes to a point source holographic data generator 63, where it is combined with a reference signal from a reference signal generator 62. The output of the data generator is then conducted to a video output device 67, where the embedded card data is displayed for easy visualization. Such data may include the authorized card owner's name, authorization number, social security number or the like, a graph of the spectral energy of the voice of the authorized person, or other personal characteristics which cannot be forged. The card reader terminal of FIG. 7 may be connected to a central data processing network for verification of the readout information, so that forgery or alteration of a card is made virtually impossible.

I claim:

1. A personal identification card system, including an identification card having a plurality of layers bonded together, acoustic data means on one internal surface of one of said layers for altering the propagation of an ultrasonic signal through said card in a predetermined, data encoding pattern, and card scanning means for directing an ultrasonic signal through said card and detecting the altered signal propagation through said acoustic data means and said predetermined, data encoding pattern within said card, wherein said acoustic data means includes an acoustically encoded holographic image.

2. A personal identification card system, including an identification card having a plurality of layers bonded together, acoustic data means on one internal surface of one of said layers for altering the propagation of an ultrasonic signal through said card in a predetermined, data encoding pattern, and card scanning means for directing an ultrasonic signal through said card and detecting the altered signal propagation through said acoustic data means and said predetermined, data encoding pattern within said card, wherein said acoustic data means includes digital data in acoustically encoded form.

3. A personal identification card system, including an identification card having a plurality of layers bonded together, acoustic data means on one internal surface of one of said layers for altering the propagation of an ultrasonic signal through said card in a predetermined, data encoding pattern, and card scanning means for directing an ultrasonic signal through said card and detecting the altered signal propagation through said acoustic data means and said predetermined, data encoding pattern within said card, wherein said acoustic data means includes analog data in acoustically encoded form.

4. A personal identification card system, including an identification card having a plurality of layers bonded together, acoustic data means on one internal surface of one of said layers for altering the propagation of an ultrasonic signal through said card in a predetermined, data encoding pattern, and card scanning means for directing an ultrasonic signal through said card and detecting the altered signal propagation through said acoustic data means and said predetermined, data encoding pattern within said card, wherein said layers are optically opaque to prevent visualization of said acoustic data means.

5. A personal identification card system, including an identification card having a plurality of layers bonded together, acoustic data means on one internal surface of one of said layers for altering the propagation of an ultraonsic signal through said card in a predetermined, data encoding pattern, card scanning means for directing an ultrasonic signal through said card and detecting the altered signal propagation through said acoustic data means and said predetermined, data encoding pattern within said card, wherein said card scanning means includes an ultrasonic transducer for emitting said ultrasonic signal, means for receiving said ultrasonic signal after said signal passes through said card, said ultrasonic transducer also comprising said means for receiving said ultraonsic signal, and further includign means for translating said card relative to said transducer and said means for receiving to scan said acoustic data means portion of said card.

6. A personal identification card system, including an identification card having a plurality of layers bonded together, acoustic data means on one internal surface of one of said layers for altering the propagation of an ultrasonic signal through said card in a predetermined, data encoding pattern, card scanning means for directing an ultrasonic signal through said card and detecting the altered signal propagation through said acoustic data means and said predetermined, data encoding pattern within said card, wherein said card scanning means includes an ultrasonic transducer for emitting said ultrasonic signal, means for receiving said ultrasonic signal after said signal passes through said card, further including liquid acoustic couplant means in which said card, said transducer, and said means for receiving are all immersed.

7. The system of claim 6, further including beam splitter means for dividing said ultrasonic signal into an interrogation signal and a reference signal, and means for directing said interrogation signal through said card to a surface of said liquid couplant means.

8. The system of claim 7, further including means for directing said reference signal to intersect said interrogation signal at said surface of said liuqid couplant means to form a holographic representation thereon.

9. The system of claim 8, further including optical holographic imaging means for converging said holographic representation at said surface of said liuqid couplant to a visible hologram.

10. A personal identification card system, including an identification card having a plurality of layers bonded together, acoustic data means on one internal surface of one of said layers for altering the propagation of an ultrasonic signal through said card ina predetermined, data encoding pattern, card scanning means for directing an ultrasonic signal through said card and detecting the altered signal propagation through said acoustic data means and said predetermined, data encoding pattern with in said card, wherein said card scanning means includes an ultrasonic transducer for emitting said ultrasonic signal, means for receiving said ultrasonic signal after said signal passes through said card, wherein said ultrasonic transducer includes a layer of piezoelectric material therein, and a plurality of conductors disposed in an array impinging on said piezoelectric layer and adapted to electrically interact with portions of said piezoelectric layer to transmit or receive ultrasonic signals.

11. A personal identification card system, including an identificationc ard having a plurality of layers bonded together, acoustic data means on one internal surface of one of said layers for altering the propagation of an ultrasonic signal through said card in a predetermined, data encoding pattern, card scanning means for directing an ultrasonic signal through said card and detecting the altered signal propagation through said acoustic data means and said predetermined, data encoding pattern within said card, wherein said card scanning emans includes an ultrasonic transducer for emitting said ultrasonic signal, means for receiving said ultrasonic signal after said signal passes through said card, further including dry acoustic coupling means interposed between said ultrasonic transducer, said card, and said receiving means for impedance-matching the acoustic signal propagation therethrough.

* * * * *